US012165497B2

(12) United States Patent
Hangartner et al.

(10) Patent No.: US 12,165,497 B2
(45) Date of Patent: Dec. 10, 2024

(54) DETECTION, ANALYSIS AND REPORTING OF FIREARM DISCHARGE

(71) Applicant: AccuShoot, Inc., Corvallis, OR (US)

(72) Inventors: Rick Hangartner, Corvallis, OR (US); Poul Petersen, Corvallis, OR (US); Francisco Martin, Corvallis, OR (US)

(73) Assignee: AccuShoot, Inc., Corvallis, OR (US)

( * ) Notice: Subject to any disclaimer, the term of this patent is extended or adjusted under 35 U.S.C. 154(b) by 204 days.

(21) Appl. No.: 17/972,563

(22) Filed: Oct. 24, 2022

(65) Prior Publication Data

US 2023/0130926 A1 Apr. 27, 2023

Related U.S. Application Data

(60) Provisional application No. 63/270,682, filed on Oct. 22, 2021.

(51) Int. Cl.
| | |
|---|---|
| *G08B 17/08* | (2006.01) |
| *G06F 16/65* | (2019.01) |
| *G06F 16/683* | (2019.01) |
| *G06F 16/687* | (2019.01) |
| *G08B 25/10* | (2006.01) |

(52) U.S. Cl.
CPC ............ *G08B 25/10* (2013.01); *G06F 16/65* (2019.01); *G06F 16/683* (2019.01); *G06F 16/687* (2019.01)

(58) Field of Classification Search
None
See application file for complete search history.

(56) References Cited

U.S. PATENT DOCUMENTS

2019/0347920 A1* 11/2019 Anderson .......... G08B 13/1672

* cited by examiner

*Primary Examiner* — John F Mortell
(74) *Attorney, Agent, or Firm* — FisherBroyles, LLP; Jeremy P. Sanders

(57) ABSTRACT

A shot fired detector can receive an audio signal or acoustic stream and determine that a firearm has been discharged. One or more detectors can be used to continuously capture acoustic streams and process the acoustic streams for anomaly detection. A detected anomaly can be classified by a machine learning model to detect that a shot has been fired. The detector can send acoustic data and meta data associated with the shot fired to a server for further storage and/or processing. An alert can be automatically generated that is associated with the shot fired.

10 Claims, 4 Drawing Sheets

DETECTION, ANALYSIS AND REPORTING OF FIREARM DISCHARGE

CROSS-REFERENCE TO RELATED APPLICATIONS

This application claims the benefit of U.S. Provisional Application No. 63/270,682 filed Oct. 22, 2021, entitled "DETECTION, ANALYSIS AND REPORTING OF FIREARM DISCHARGE," the contents of which are incorporated herein by reference in its entirety.

BACKGROUND

The number of firearms owned by civilians in the United States is huge and growing. Also increasing at an alarming rate is the use of firearms in the commission of crimes. Armed individuals are of great concern to law enforcement officers responding to a dispatch. In general, law enforcement officers (LEO) must notify dispatch immediately if a suspect (or another law enforcement officer) fires a weapon. The phrase "shots fired" is heard quite often in replay of recorded law enforcement communications.

To report a shot fired (for example, by keying a microphone on a radio), a law enforcement officer may have to remove her stabilizing hand from her weapon. Further, the need to make an immediate report of a shot fired causes a potentially dangerous interruption of an LEO's attention. In addition, accurate data collection of shooting events is critically important and current technology is quite limited in terms of cost, scope of applicability, and accuracy. Indeed, arrests and even prosecution of innocent persons based on flawed shots fired data has been reported.

The need remains for improvements in methods and systems to detect and document shots-fired without law enforcement officer or other human user action. More complete and more accurate documentation about shots-fired is needed. Further, robust secure storage of information for subsequent forensic analyses would be useful to law enforcement and other users.

SUMMARY

The improvements are in the field of AI and machine learning, and more specifically, relate to machine learning applied to processing acoustic data to detect the discharge of a firearm (a shot fired) in real time, and automatically initiate predetermined actions or processes responsive to detecting a shot fired, to assist law enforcement and for other public safety purposes as well as in the battlefield when small commands or special forces are deployed.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes entering a standby listening mode to acquire sound data responsive to sound received at an acoustic transducer associated with the mobile computing device. The entering also includes analyzing the acquired sound data to detect a sound produced by a shot fired by a weapon; responsive to detecting a shot-fired sound: capturing and storing metadata of the shot-fired sound; and automatically and without manual input to a user interface of the mobile computing device, transmitting a digital, not audible, shot-fired message to a server, the message including at least some of the stored metadata. Other embodiments of this aspect include corresponding computer systems, apparatus, and computer programs recorded on one or more computer storage devices, each configured to perform the actions of the methods.

Implementations may include one or more of the following features. The memory where the stored instructions further cause the processor to present an indication to the user interface of the mobile device that the shot-fired message was transmitted to the server. The acoustic transducer may include an audio microphone, an acoustic pressure sensor, or other acoustic transducer. The metadata includes an identifier of a person associated with the mobile device. The metadata includes at least one of distance, direction, and location data of the shot-fired sound. The metadata includes a timestamp of the shot-fired sound. The stored instructions may include an application executable on a smartphone and the message is transmitted using a data communications feature of the smartphone. The stored instructions further cause the processor to apply machine learning to detect shots and differentiate shot-fired sounds from non-shot sounds. The machine learning incorporates anomaly detection to differentiate shot-fired sounds from non-shot sounds. The machine learning employs a classifier model to differentiate shot-fired sounds that is based at least in part on a dataset of acoustic data acquired by firing weapons and storing acoustic data emitted by the weapons when fired. The machine learning is cloud-based and is executed on computing resources remote from the mobile computing device. The machine learning includes determining a probable type of weapon that was fired to cause the shot-fired sound. The machine learning includes determining a probable type of ammunition that was fired to cause the shot-fired sound. Implementations of the described techniques may include hardware, a method or process, or computer software on a computer-accessible medium.

One general aspect includes a server provisioned in a cloud computing environment and configured to execute the steps of. The server also includes receiving a shot-fired message from a mobile device; logging and securely storing the shot-fired message, and correlating the shot-fired message to other shot-fired messages based on timestamp and location data to form a correlated group of shot-fired messages. Other embodiments of this aspect include corresponding computer systems, apparatus, and computer programs recorded on one or more computer storage devices, each configured to perform the actions of the methods.

Implementations may include one or more of the following features. The server further configured to analyze the group of shot-fired messages to determine a probable time and location of a shot fired. The server further configured to analyze the group of shot-fired messages to determine a probable type of weapon that fired to cause the shot-fired messages. The server further configured to analyze the group of shot-fired messages to determine a probable type of ammunition that fired to cause the shot-fired messages. The server further configured to generate an alert associated with the shot-fired message. The server further configured to: receive a stream of acoustic data in real time, the acoustic data may include a series of acoustic data samples; generate a corresponding feature vector for each of the acoustic data samples; apply machine learning anomaly detection to the feature vectors to detect an anomaly in the feature vectors; process a detected anomalous feature vector as an indication of a probable shot fired; and determine, based upon the anomalous feature vector, that a shot has been fired. Implementations of the described techniques may include hardware, a method or process, or computer software on a computer-accessible medium.

In one aspect, embodiments disclose an always-on acoustic shot detector device/application for use by law enforcement officers and others. The term "always on" is not used literally, but is meant to convey that no affirmative action need be taken by a user for the device/application to function as described below.

In one example embodiment, the device is a portable device having a digital processor to execute an application program ("app"), for example, a "smartphone" of the general type made and sold by Apple Inc. and Samsung Electronics Co., Ltd. In some cases, a smartphone, or other mobile computing device that may be carried by a LEO or within a police vehicle, can be configured to operate as described herein.

A modern mobile phone or other mobile computing device has multiple mechanical, electrical, and signal processing features for extracting good voice-band sound, e.g., multiple microphones and their placement, electronic automatic gain control (AGC), and echo cancellation processing. It turns out these features do a surprisingly good job of capturing a sound waveform from which one can extract a useful approximation to the acoustic pressure wave when the device is close to the weapon.

In more detail, the shot detection device could be based on any type of acoustic transducer, e.g. an audio microphone, an acoustic pressure sensor, or a yet-to-be invented acoustic transducer. The "sound" of a shot is really a single acoustic pressure wave with a certain general profile. Microphones pick up resonances of this pressure wave due to the microphone mechanics and the external environment. In preferred embodiments, a processor may first extract an approximation to the pressure wave from the audio captured by the microphone.

In some embodiments, a process extracts that approximation to the pressure wave using conventional DSP (digital signal processing) linear and nonlinear filtering. In some embodiments, a deep-learning network could be used to do this. In some embodiments, there may be plural extractors, each tuned/trained to the pressure wave/sound for some class of weapon/ammunition. These processors may be used not only to detect "shots fired" but to help identify the weapon the weapon/ammunition used.

In practice, and particularly in urban environments with a lot of hard surfaces (e.g. building walls, pavement, concrete, etc.), one should anticipate that any acoustic transducer could sense multiple reverberations of the acoustic pressure wave. Considering (or appropriately filtering) reverberations or reflections detected by acoustic transducers can be done in various ways.

In one example, a method according to this disclosure equips law enforcement officers and/or their vehicles with always-on shot detector device/applications characterized by one or more of the following features:

- No audio transmissions by shot detector, only shot detection information
- Shot detectors networked to cloud server(s)
- Use of machine learning to detect shots and differentiate from non-shots
- Securely log shot data and associated data, including GPS coordinates
- Data includes information to correlate results from multiple detectors
- Cloud processing with ML to further analyze shots (e.g. echo cancellation)

Additional features and benefits in some embodiments include one or more of the following:

- Shot detectors follow LEOs, experiencing what they do on the ground. In other words, the mobile device travels with the law enforcement officer or her vehicle. For example, in a preferred embodiment, the mobile device may be carried on a person, much like a police "body cam" or body-worn video camera. In some embodiments, the present detector and associated electronics may be integrated with video capture capability in a single unit. These could also be deployed in fixed locations, for example high crime neighborhoods or high security environments like banks, houses of important people, prisons, etc. Or perhaps even in an aerial drone to help identify the location of an active shooter in real time.
- Chain of custody for data can be maintained and made difficult to alter. This chain of custody is sometimes critical for admissibility of the data into evidence in a court of law.
- Post-processing opportunities for combining data from multiple detectors
- In particular echo cancellation, triangulation, shot-counting, and weapon type are all types of information that may be generated or processed with the methods and apparatus disclosed herein.

In some embodiments, a system may comprise one or more shot detectors (each "detector" comprising a mobile device and app). The mobile device may include built-in data communications features, for example, Bluetooth, Wi-Fi, and various mobile data networks such as a cellular data network. The detectors use these capabilities to communicate with a server, which may be a cloud-based server and or distributed computing devices and generally is associated with the local law enforcement agency or "dispatch" facility.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

To enable the reader to realize one or more of the above-recited and other advantages and features of the present disclosure, a more particular description follows by reference to specific embodiments thereof which are illustrated in the appended drawings. Understanding that these drawings depict only typical embodiments of the disclosure and are not therefore to be considered limiting of its scope, the present disclosure will be described and explained with additional specificity and detail through the use of the accompanying drawings in which.

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Figure 1:
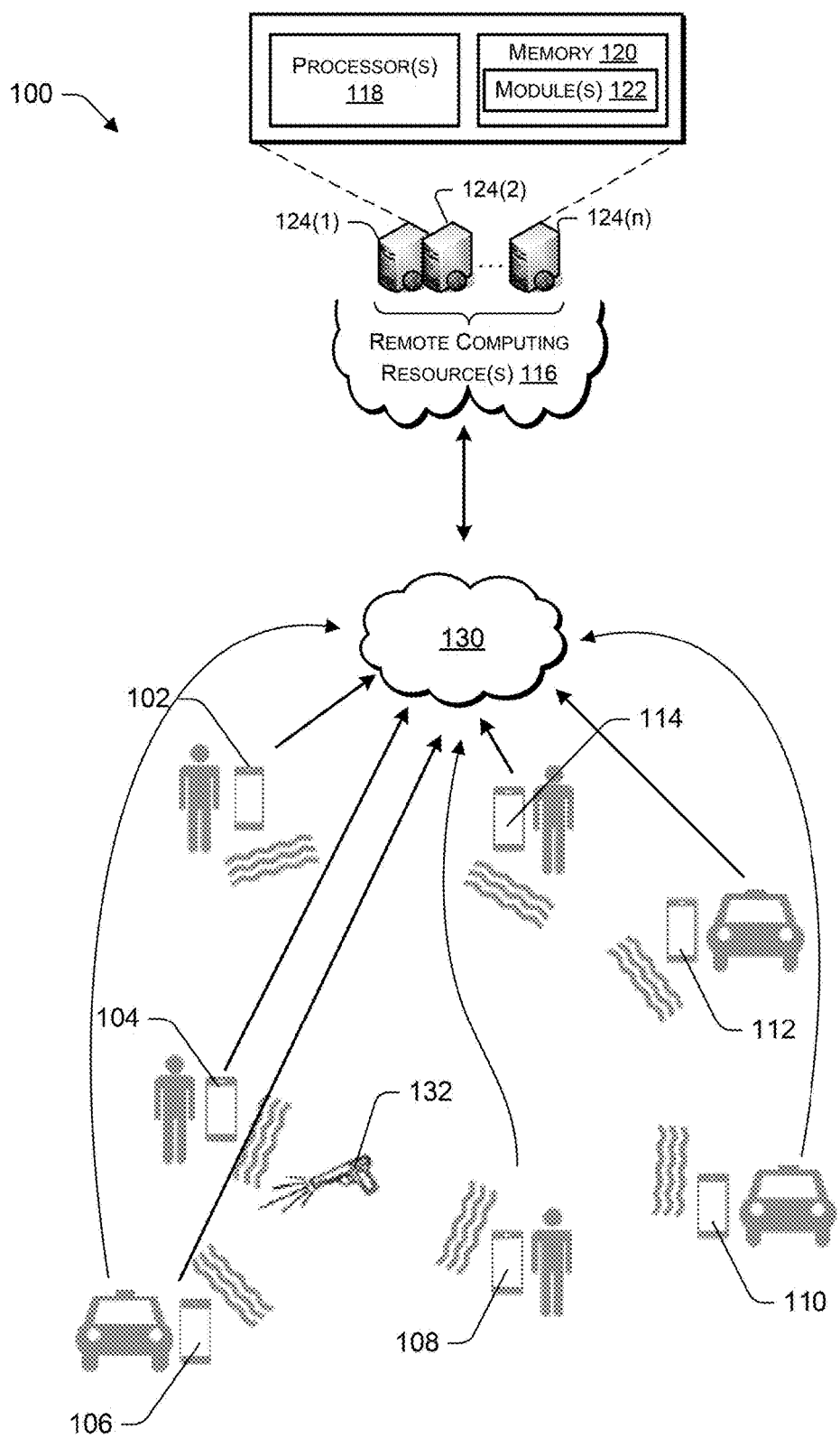
FIG. 1 is a simplified overview of an example client-server system, in accordance with some embodiments.

Referring now to FIG. 1, it illustrates an overview of a system 100 of one example application scenario. It shows plural acoustic detector client systems 102, 104, 106, 108, 110, 112, 114, and remote computing resources 116 (e.g., "Server" systems), which may be provisioned in the Cloud or on premises. The Server systems 116 implement data aggregation and machine learning as described in more detail below. The server systems 116 may include one or more processors 118, memory 120, and one or more modules 122. The server systems 116 may include one or more computing systems 124(1), 124(2) . . . 124(n), which may be arranged as a distributed computing environment, cloud computing environment, on-premises servers, or some other computing architecture. In some embodiments, the acoustic detector client systems (e.g., 102, 104 . . . 114) may be in communication with the server systems 116 via a wireless network, such as the internet 130. In some cases, the acoustic detector client systems are in one-way communication as they send data to the server system 116, and in some cases, there is 2-way communication in which the server system 116 exchange data with the acoustic detector client systems.

On the client side, several LEOs each have a portable device, for example a smart phone or body-worn apparatus (e.g. acoustic detector client systems), capable of capturing acoustic emissions (shown as wavy lines) from a discharged firearm 132 (one pistol shown). Other detector client systems may be provided in vehicles as mentioned above (e.g., 106, 110, 112).

Figure 2:
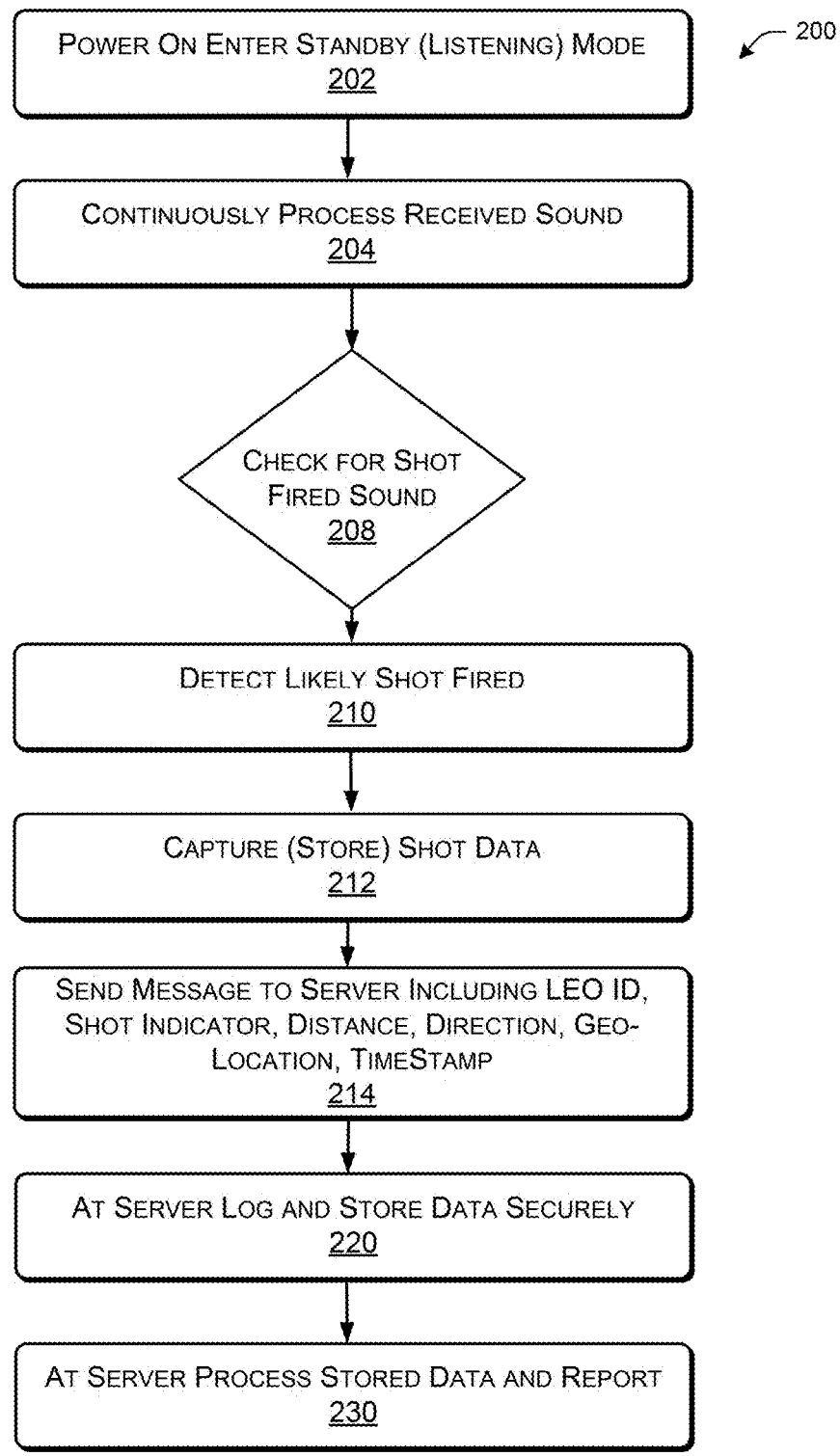
FIG. 2 is a simplified process flow diagram of one example embodiment, in accordance with some embodiments.

FIG. 2 is a simplified flow diagram of one example embodiment of a process 200 consistent with embodiments of the present disclosure. The system (or application program), after initialization, enters a standby or "listening" mode, at block 202. At block 204, the system receives and continuously processes sound data received from various microphones, acoustic pressure sensors or the like. The system may receive sound data from multiple detectors and may correlate the received sound data from a first sound detector with sound data received from a second sound detector. In some cases, the sound is continuously received and processed as waveform sampled data. In some instances, a library of waveforms may be compiled that can be used for trailing ML components. The waveform sampled data may be converted into other representations in some embodiments. For example, convolutional deep neural networks ("CDNN") may be used to "recognize" sounds. The input data to CDNNs may be a numeric representation of a spectrogram, which may be thought of as a visual representation of audio in time. According to some instances, the system receives sound data and converts it to a numeric representation of a spectrogram and analyzes the numeric representation for a shot fired indication. At block 208, the process 200 tests whether a received sound resulted (or probably resulted) from a shot fired. This can be done using various ML techniques such as a suitably trained classifier. A machine learning classifier may be a function that classifies objects, such as images or sound data. It can be created by training on a set of training data or known objects. The training data may be numerical, textual, acoustic, images, or combinations. The training data is used as samples of classes of data that is run through the classifier to train it on what constitutes a given class. The trained classifier can then be run on unknown data to determine which classes the unknown data belongs to.

At block 210, when a shot fired is detected, for example by the likelihood that a sound is classified as a shot fired exceeds a selected confidence level, the shot data and metadata are stored, at block 212. Preferably this storage is done in a secure manner—both in the sense of limited access and retaining the original data reliably unchanged. The data and metadata may include one or more of the recorded acoustic files, an acoustic waveform, timestamp data, location data (e.g., GPS data), a unique identifier of the acoustic detector client system, a LEO identification, the action taken by the system in response to the shot fired detector, among others.

At block 214, the system may automatically send a message over a suitable data channel to a server, for example, a law enforcement agency server. This may be done immediately after a shot fired is detected, without any action by the user, such as a LEO. In some extreme cases, this automated action can be life-saving, such as where the officer has incurred a gunshot wound or otherwise is injured and unable to report the situation. At block 220, the system may log and securely store the received data. For instance, the message transmitted to the server may include an identifier of the user or LEO and a shot fired indication, geo-location of the transmitting station, and a timestamp. In some cases, the system will record additional audio beyond the shot fired detection and it may send the additional audio to the server, which may provide additional cues to the receiver as to the situation immediately following the shot fired detection. In some embodiments, at block 214 the system may also attempt to discern and transmit distance and direction of the detected shot.

At block 230, the server may receive and process the received message(s) and may trigger various actions, such as a notification to other system operators, commanders, local government, other agencies, etc. The server also may seek to collect data/messages at similar times and locations, and aggregate that data to form a more complete (or more reliable) "picture" of what occurred. This kind of processing need not be done in real time, but may be.

A notification that a shot has been fired could also be distributed automatically to LEOs and dispatchers through these standard systems. For example, a shot fired detection from a computing device associate with a first LEO may automatically be routed and provided to a second LEO, to dispatch, to a commander, or other interested party. In some embodiments, a server may combine data from multiple officers, vehicles, drones or fixed locations to better distinguish shots from other noise and their location(s). In more detail, it is assumed that none of the received data may be very precise because of the likely error rate of shot/not shot classification, latencies in the networks, and because LEOs are moving around. According to some embodiments, machine learning is used to construct a classifier to distinguish shots from non-shots among various anomalies in ambient noise conditions.

Figure 3:
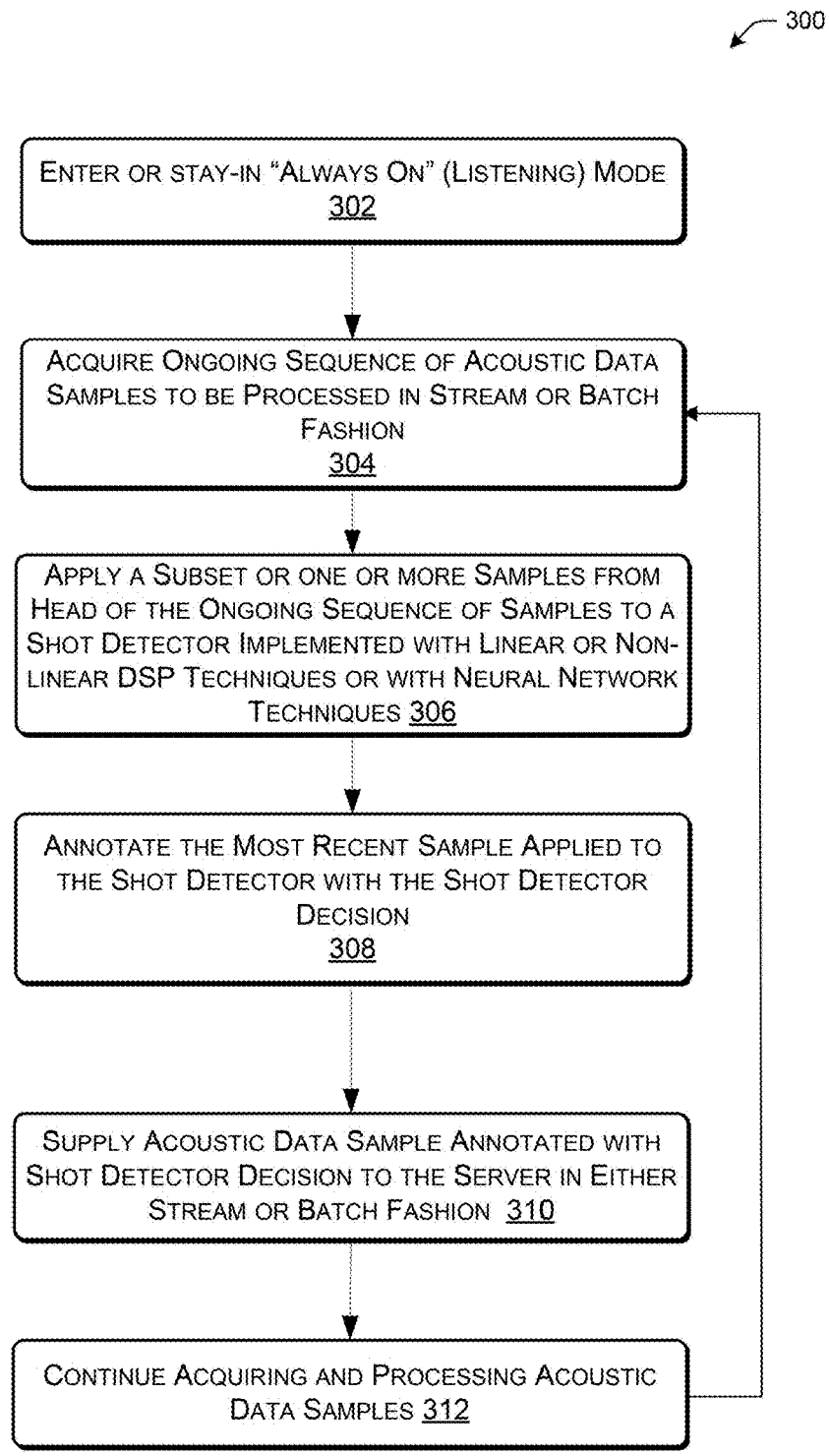
FIG. 3 is a simplified flow diagram of one example process inside a single shot detector, in accordance with some embodiments.

FIG. 3 is a simplified process flow diagram 300 of one example embodiment process that may be performed inside a single shot detector, such as a mobile computing device. At block 302, the system may initialize and enter or say in "Always On" (Listening) Mode. In this mode, the system may continually receive acoustical data and process the data to detect a shot fired.

At block 304, the system continues to acquire an ongoing sequence of acoustic data samples to be processed in stream or batch fashion. The system may process the incoming acoustic data in real time as it arrives via one or more acoustic transducers associated with the mobile computing device. In some embodiments, the mobile computing device may break the incoming acoustic stream into chunks and process each of the chunks of acoustic data to determine a shot fired indication.

At block 306, the system applies a subset or one or more samples from a head of the ongoing sequence of samples to a shot detector implemented with linear or non-linear digital signal processing ("DSP") techniques or with neural network techniques. For example, one or more shot detector algorithms may be executed on the incoming acoustic stream or samples of the acoustic stream to determine a shot fired. In some cases, the system continually monitors the incoming acoustic stream and may flag certain portions of the acoustic stream that are associated with anomalies in the acoustic stream. The anomalies may be further processed by one or more DSP algorithms to determine if the anomaly is associated with a shot fired. In some cases, the anomaly may correspond with a spike in a waveform indicative of a greater magnitude, frequency, and/or pressure wave than surrounding acoustic data.

At block 308, the system may be configured to annotate the most recent sample applied to the shot detector with the shot detector decision. In other words, a portion of the acoustic data that has been processed may be tagged with one or more tags that indicate whether the acoustic data is determined to correspond with a shot fired. In some cases, the tags are later reviewed for updated training of the algorithms used to process the acoustic data.

At block 310, the system supplies the acoustic data sample annotated with shot detector decision to the server in either stream or batch fashion. In some cases, the annotated acoustic data is further processed by the server to verify the tagging decision and/or to further train the shot fired detector model.

At block 312, the system continues acquiring and processing acoustic data samples. This provides an always-on shot fired detector that may continually process received acoustic data to determine a shot fired indication.

Machine Learning for Shot Fired Detection

According to some embodiments, anomaly detection is useful considering that shots fired generate acoustic anomalies relative to the background sounds. This can be done in several ways. One solution is to define a set of measurements as a "feature vector"—and apply those measurements to acoustic samples so that each sample or data point has a corresponding feature vector. Then we apply anomaly detection tools to find unusual feature vectors—in this case the acoustic report of a shot fired—in a stream of sample data. ML algorithms may be applied to sampled acoustic waveforms to identify characteristic features to help define the most useful feature vectors.

In some cases, continuous data flow ML and classification (including anomaly detection) may be processed using, for example, Apache Kafka. Apache Kafka is an open-source distributed event streaming platform used by thousands of companies for high-performance data pipelines, streaming analytics, data integration, and mission-critical applications.

According to some examples, a data pipeline used with embodiments may comprise one or more of the following: Raw acoustic data is produced into Kafka streams. Data transformation code may consume data from Kafka streams, compute various measures that can be accumulated in data storage functions like Mongo or SQL Relational Database Management Systems ("RDBMS"), and produces transformed data into new Kafka streams. A machine learning platform may be provisioned to consume data from resulting new Kafka streams and classify the resulting new Kafka streams. A shot fired may be included as one of the classification results, and those results associated back to the input source. In this way, the input source can be classified and tagged as a shot fired, where appropriate.

Figure 4:
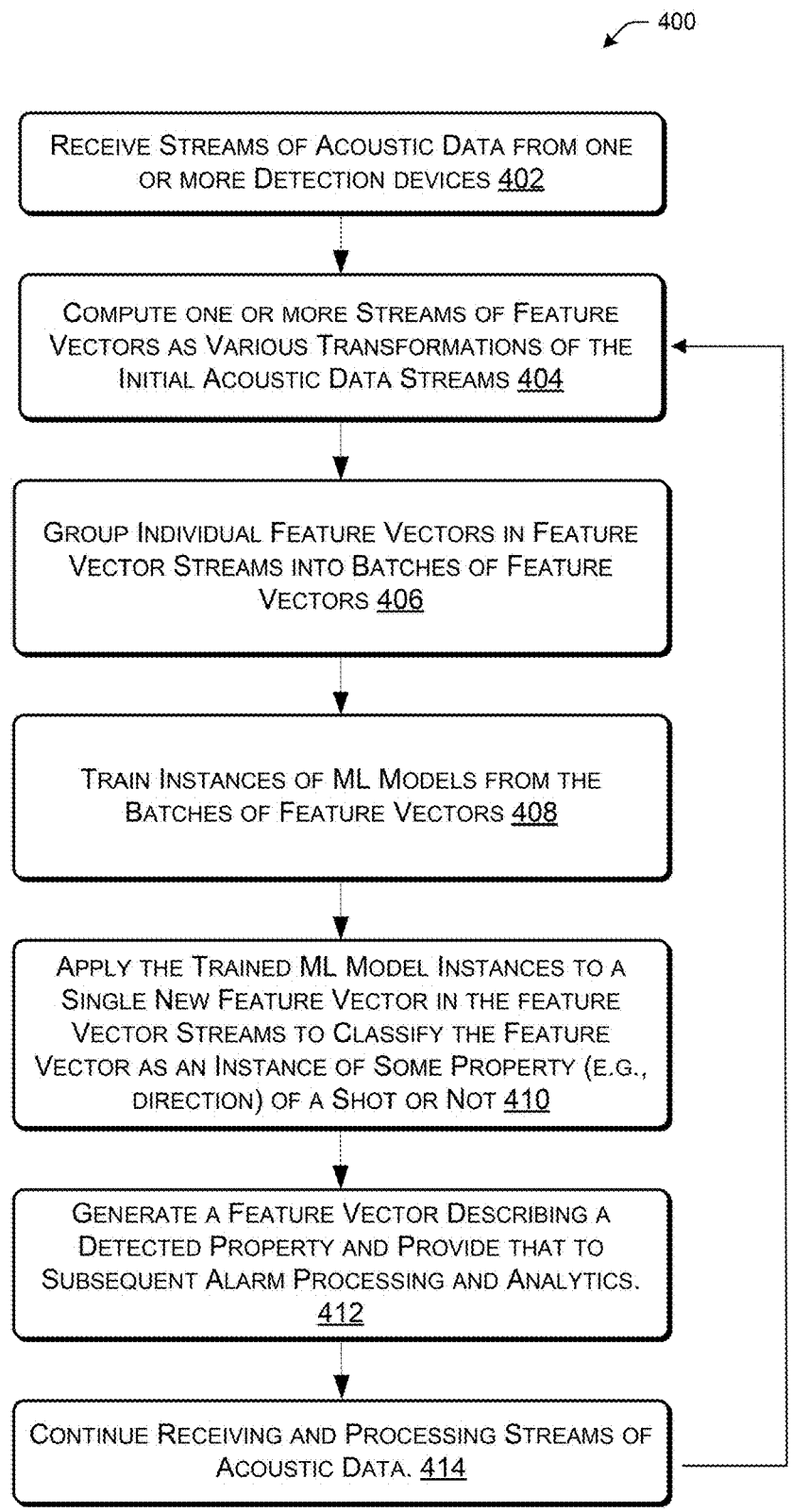
FIG. 4 is a simplified flow diagram of one example processing potential detected shots from one or more shot detection devices, in accordance with some embodiments.

FIG. 4 is a simplified process flow diagram 400 of one example of processing potential detected shots from one or more shot detection devices. At block 402, the system receives streams of acoustic data from one or more detection devices. As discussed elsewhere herein, the detection device can be any suitable detector that can receive audio and/or pressure data and may include mobile computing devices (e.g., smart phones, tablets, wearable devices, cameras, traffic cameras, among others).

At bock 404, the system computes one or more streams of feature vectors as various transformations of the initial acoustic data streams. A feature vector is an ordered list of measurable properties of observed object and represents the input features to a ML model that makes a pattern recognition prediction.

At block 406, the system groups individual feature vectors found in feature vector streams into batches of feature vectors. This may be performed, for example, by identifying discrete feature vectors in the feature vector stream and tagging, segregating, or both into individual feature vectors. The individual feature vectors may be grouped together after an initial classification, which may be automated. In some cases, feature vector classification may be based on one or more features within the feature vector.

At block 408, the system trains instances of ML models from the batches of feature vectors. This may be automated and may also be an iterative process in which the ML model iterates on one or more batches of feature vectors until a confidence score for each classification is above a threshold.

At block 410, the system applies the trained ML model instances to a single new feature vector in the feature vector streams to classify the feature vector as an instance of some property (e.g. direction) of a shot or not.

At block 412, the system generates a feature vector describing a detected property and provides that for subsequent alarm processing and analytics. For example, a detected property received by a detector may include a shot fired property, and the presence of a shot fired property may be used to trigger an alarm and may also be used to analyze additional feature vector streams that may have a similar time stamp and/or geolocation to corroborate the shot fired detection.

At block 414, the system continues receiving and processing streams of acoustic data and repeats the receiving, processing, and determining steps of 404-412.

The ML models in combination with other computations can produce various types of information. For instance, multiple detections of a single shot including the times of the shots may be combined with the location of the detectors to infer the direction of a shot, and potentially determine whether the shot was in the direction of an LEO. In some embodiments, the geolocation of a detector worn or carried by an LEO is known and can be used in the direction determination. Detections of multiple shots can/could be used to generate an alert that multiple shots have been fired, how many shots, and by how many shooters (e.g., how many firearms were discharged).

Microphones on a Law Enforcement Vehicle

In some applications, a vehicle's sensors may be used instead of, or in addition to, body-worn or carried equipment. For example, one or more microphones or other acoustic or pressure sensors may be deployed around the exterior of a vehicle such as a car, truck, motorcycle, bicycle, horse etc. These microphones may be coupled to a processor, again preferably on board the vehicle, for analysis of detected sounds. In one alternative, the sound processing may be done by an application (software process, method or component) on a device or system already in the vehicle that has audio capture capability.

In some embodiments, the sound processing may be performed in a separate device with its own networking capabilities. Vehicle-borne detector(s) may be used as an additional source of information, but may not be required in the context of body-worn equipment. For a preferred vehicle-borne scenario, plural semi-directional acoustic detectors facing in multiple directions may be deployed on a vehicle. Information from such detectors may be combined with body-worn equipment data, either on scene or at a remote server, or both.

A gunshot typically generates an "acoustic disturbance" that last around 3-5 milliseconds. Accordingly, in some embodiments, a detector sample rate on the order of one millisecond would be useful. In the example of a mobile phone implementation, the input data stream is "raw" audio data samples at frequencies that can range between 8 kHz and 44.1 kHz. Acoustic pressure transducers could be sampled at even higher rates, since the attack rate of the acoustic wave can be quite high. Thus, data "sample rates" may vary depending on the equipment and processing utilized.

In some cases, the processing of acoustic streams includes time stamp data and the acoustic streams from multiple detectors can compare the time stamp data to determine the time difference between acoustic disturbances received by different detectors. The time differences can be used to triangulate the source of the acoustic disturbance and/or the direction of the acoustic disturbance.

Legal Evidentiary Considerations

In some cases, shots-fired data may be relevant to a legal proceeding such as a criminal prosecution. The rules of evidence are designed to ensure that admissible evidence is reliable, i.e., that it is has not been altered from the original source. Embodiments of the present disclosure can be arranged to meet those requirements. For example, Kafka data streams are immutable. Data is produced into streams and may be stored in log files and read out from those into streams to be consumed. The stored data in those log files may be retained for a specifiable period of time. Second, the entire system described here may be deployed on local or cloud platforms that can provide secure retention functions.

Privacy

Privacy is a challenge for law enforcement recording systems such as body cams. They often capture video and audio of innocent bystanders, for example. Consequently, agencies incur substantial expenses to review and, if necessary, filter or redact data to respond to requests for information, such as, for example, under public records laws. In some embodiments of the present disclosure, privacy is preserved since no audio would be sent upstream and in some embodiments, no audio would be preserved.

The system may include one or more processors and one or more computer readable media that may store various modules, applications, programs, or other data. The computer-readable media may include instructions that, when executed by the one or more processors, cause the processors to perform the operations described herein for the system.

In some implementations, the processor(s) may include a central processing unit (CPU), a graphical processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program modules, program data, and/or one or more operating systems. The one or more control systems, computer controller and remote control, may include one or more cores.

Embodiments may be provided as a computer program product including a non-transitory machine-readable storage medium having stored thereon instructions (in compressed or uncompressed form) that may be used to program a computer (or other electronic device) to perform processes or methods described herein. The computer-readable media may include volatile and/or nonvolatile memory, removable and non-removable media implemented in any method or technology for storage of information, such as computer-readable instructions, data structures, program modules, or other data. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

As used herein, the term "or" is used inclusively to refer items in the alternative and in combination. As used herein, characters such as numerals refer to like elements.

The disclosure sets forth example embodiments and, as such, is not intended to limit the scope of embodiments of the disclosure and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A server provisioned in a cloud computing environment and configured to execute the steps of:
   receiving a shot-fired message from a mobile device;
   logging and securely storing the shot-fired message; and
   correlating the shot-fired message to other shot-fired messages based on timestamp and location data to form a correlated group of shot-fired messages.

2. The server of claim 1, further configured to analyze the group of shot-fired messages to determine a probable time and location of a shot fired.

3. The server of claim 2, further configured to analyze the group of shot-fired messages to determine a probable type of weapon that fired to cause the shot-fired messages.

4. The server of claim 2, further configured to analyze the group of shot-fired messages to determine a probable type of ammunition that fired to cause the shot-fired messages.

5. The server of claim 1, further configured to generate an alert associated with the shot-fired message.

6. The server of claim 1, further configured to:
   receive a stream of acoustic data in real time, the acoustic data comprising a series of acoustic data samples;
   generate a corresponding feature vector for each of the acoustic data samples;
   apply machine learning anomaly detection to the feature vectors to detect an anomaly in the feature vectors;
   process a detected anomalous feature vector as an indication of a probable shot fired; and
   determine, based upon the anomalous feature vector, that a shot has been fired.

7. The server of claim 1, wherein the shot-fired message further includes meta data associated with the shot-fired message.

8. The server of claim 7, wherein the meta data includes one or more of an identifier associated with the mobile device that transmitted the shot-fired message, a distance of a shot-fired sound from the mobile device, a direction of the shot-fired sound relative to the mobile device, location data associated with the mobile device, and a time stamp associated with the shot-fired sound.

9. The server of claim 5, wherein the alert comprises one or more of an indication that multiple shots were fired, a number of shots fired, and how many different firearms were discharged.

10. The server of claim 1, further configured to:
    receive a second shot-fired message from a second mobile device;
    correlate the second shot-fired message with the shot-fired message and determine that the shot-fired message and the second shot-fired message relate to a single shot-fired event;
    compare a first time stamp associated with the shot-fired message and a second time stamp associate with the second shot-fired message to determine a time difference; and
    triangulate, based at least in part on the time difference, a location of the single shot-fired event relative to the mobile device and the second mobile device.

* * * * *